(12) United States Patent
Niu et al.

(10) Patent No.: US 8,051,061 B2
(45) Date of Patent: Nov. 1, 2011

(54) CROSS-LINGUAL QUERY SUGGESTION

(75) Inventors: Cheng Niu, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 12/033,308

(22) Filed: Feb. 19, 2008

(65) Prior Publication Data

US 2009/0024613 A1    Jan. 22, 2009

Related U.S. Application Data

(60) Provisional application No. 60/951,029, filed on Jul. 20, 2007.

(51) Int. Cl.
*G06F 17/30* (2006.01)

(52) U.S. Cl. ........ 707/706; 707/748; 707/749; 707/760; 704/1; 704/8; 704/9

(58) Field of Classification Search ............... 707/706, 707/748, 749, 760; 704/1, 8, 9
See application file for complete search history.

(56) References Cited

U.S. PATENT DOCUMENTS

| | | | |
|---|---|---|---|
| 5,301,109 A | 4/1994 | Landauer et al. | |
| 5,787,410 A | 7/1998 | McMahon | |
| 5,956,740 A | 9/1999 | Nosohara | |
| 6,055,528 A | 4/2000 | Evans | |
| 6,064,951 A | 5/2000 | Park et al. | |
| 6,081,774 A | 6/2000 | de Hita et al. | |
| 6,321,189 B1 * | 11/2001 | Masuichi et al. | 704/7 |
| 6,321,191 B1 * | 11/2001 | Kurahashi | 704/8 |
| 6,370,498 B1 | 4/2002 | Flores et al. | |
| 6,381,598 B1 | 4/2002 | Williamowski et al. | |
| 6,604,101 B1 | 8/2003 | Chan et al. | |
| 7,146,358 B1 | 12/2006 | Gravano et al. | |
| 7,149,688 B2 | 12/2006 | Schalkwyk | |
| 7,194,455 B2 * | 3/2007 | Zhou et al. | 1/1 |
| 7,260,570 B2 | 8/2007 | Brown et al. | |
| 7,269,598 B2 | 9/2007 | Marchisio | |
| 7,720,856 B2 | 5/2010 | Goedecke et al. | |
| 7,809,714 B1 * | 10/2010 | Smith | 707/713 |
| 7,814,103 B1 * | 10/2010 | Gravano et al. | 707/736 |
| 2001/0029455 A1 | 10/2001 | Chin et al. | |
| 2002/0111792 A1 | 8/2002 | Cherny | |
| 2004/0230417 A1 | 11/2004 | Kraiss et al. | |
| 2005/0021323 A1 * | 1/2005 | Li | 704/5 |
| 2005/0071152 A1 * | 3/2005 | Morimoto et al. | 704/10 |

(Continued)

OTHER PUBLICATIONS

Ballesteros et al., "Phrasal Translation and Query Expansion Techniques for Cross-Language Information Retrieval," In Proceedings of the 20th Annual International ACM SIGIR, 1997, 8 pgs.

(Continued)

*Primary Examiner* — Thanh-Ha Dang
(74) *Attorney, Agent, or Firm* — Lee & Hayes, PLLC

(57) ABSTRACT

Cross-lingual query suggestion (CLQS) aims to suggest relevant queries in a target language for a given query in a source language. The cross-lingual query suggestion is improved by exploiting the query logs in the target language. CLQS provides a method for learning and determining a similarity measure between two queries in different languages. The similarity measure is based on both translation information and monolingual similarity information, and in one embodiment uses both the query log itself and click-through information associated therewith. Monolingual and cross-lingual information such as word translation relations and word co-occurrence statistics may be used to estimate the cross-lingual query similarity with a discriminative model.

20 Claims, 5 Drawing Sheets

U.S. PATENT DOCUMENTS

| | | | |
|---|---|---|---|
| 2005/0125215 A1* | 6/2005 | Wu et al. ............................ 704/1 |
| 2005/0273318 A1* | 12/2005 | Zhou et al. ....................... 704/10 |
| 2006/0009963 A1* | 1/2006 | Gaussier et al. ................... 704/7 |
| 2006/0173839 A1* | 8/2006 | Knepper et al. ................... 707/5 |
| 2006/0173886 A1 | 8/2006 | Moulinier et al. |
| 2006/0265209 A1* | 11/2006 | Bradford ............................ 704/9 |
| 2007/0022134 A1 | 1/2007 | Zhou et al. |
| 2007/0027905 A1 | 2/2007 | Warren et al. |
| 2007/0214131 A1* | 9/2007 | Cucerzan et al. .................. 707/5 |
| 2008/0288474 A1* | 11/2008 | Chin et al. ......................... 707/4 |
| 2009/0125497 A1* | 5/2009 | Jiang et al. ......................... 707/4 |

OTHER PUBLICATIONS

Burges et al, "Learning to Rank using Gradient Descent," Proceedings ICML, 2005, Germany, pp. 89-96.

Cao et al, "Adapting Ranking SVM to Document Retrieval," In Proceedings of SIGIR '06, 2006, 8 pgs.

Gao et al, "Cross-Lingual Query Suggestion Using Query Logs of Different Languages," Proceedings of SIGIR '07, ACM, 2007, Amsterdam, 8 pgs.

Gao, et al., "Statistical Query Translation Models for Cross-Language Information Retrieval", at <<http://research.microsoft.com/~jfgao/paper/gao_nie_zhou.talip2006.rev.pdf>>, ACM, Dec. 2005, pp. 36.

Gleich et al., "SVD Subspace Projections for Term Suggestion Ranking and Clustering," In Technical Report, Yahoo! Research Labs, 2004, 7 pgs.

Hull, "Using Statistical Testing in the Evaluation of Retrieval Experiments," In Proc. SIGIR, 1993, 9 pgs.

Jang et al, "Using Mutual Information to Resolve Query Translation Ambiguities and Query Term Weighting," ACM, 1999, pp. 223-229.

Jeon, et al, "Finding Similar Questions in Large Question and Answer Archives," In Proc. CIKM, 2005, 7 pgs.

Lavrenko, et al., "Cross-Lingual Relevance Models," In Proc. SIGIR, 2002, 8 pgs.

Lu et al, "Towards Web Mining of Query Translations for Cross-Language Information Retrieval in Digital Libraries," ICADL, 2003, 12 pgs.

McNamee et al, "Comparing Cross-Language Query Expansion Techniques by Degrading Translation Resources," In Proc. SIGIR 2002, pp. 159-166.

Nie et al, "Cross-Language Information Retrieval based on Parallel Texts and Automatic Mining of Parallel Texts from the Web," SIGIR, 1999, 8 pgs.

Pingali, et al., "Experiments in Cross Language Query Focused Multi-Document Summarization", available at least as early as Nov. 2, 2007, at <<http://search.iiit.ac.in/CLIA2007/papers/CLQSum.pdf>>, pp. 7.

Ponte et al, "A Language Modeling Approach to Information Retrieval," In Proceedings of SIGIR '98, ACM, 1998, 7 pgs.

Robertson et al, "Okapi at TREC-3," In ProceedingsTREC-3, 1995, 19 pgs.

Tur, et al., "Using Information Extraction to Improve Cross-lingual Document Retrieval", available at least as early as Nov. 2, 2007, at <<http://www.cs.nyu.edu/hengji/CrosslingualIEIR.pdf>>, pp. 7.

Wang et al, "Translating Unknown Cross-Lingual Queries in Digital Libraries Using a Web-based Approach," Proceedings of the 2004 Joint ACM/IEEE Conference on Digital Libraries (JCDL'04), 2004, pp. 108-116.

Wen et al, "Query Clustering Using User Logs," ACM Transactions Information Systems, vol. 20, No. 1, Jan. 2002, pp. 59-81.

Diligenti et al., "A Unified Probabilistic Framework for Web Page Scoring Systems", IEEE Transaction on Knowledge and Data Engineering, Jan. 2004, vol. 16, No. 1, pp. 4-16.

* cited by examiner

CROSS-LINGUAL QUERY SUGGESTION

PRIORITY AND RELATED APPLICATIONS

This patent application claims priority to U.S. Provisional Patent Application Ser. No. 60/951,029, entitled "CROSS-LINGUAL QUERY SUGGESTION" filed Jul. 20, 2007.

BACKGROUND

Query suggestion helps users of a search engine to better specify their information need by narrowing down or expanding the scope of the search with synonymous queries and relevant queries, or by suggesting related queries that have been frequently used by other users. Search engines, such as Google, Yahoo!, MSN, Ask Jeeves, all have implemented query suggestion functionality as a valuable addition to their core search method. In addition, the same technology has been leveraged to recommend bidding terms to online advertiser in the pay-for-performance search market.

Typical methods for query suggestion perform monolingual query suggestion. These methods exploit query logs (of the original query language) and document collections, assuming that in the same period of time, many users share the same or similar interests, which can be expressed in different manners. By suggesting the related and frequently used formulations, it is hoped that the new query can cover more relevant documents.

The existing techniques for cross-lingual query suggestion are primitive and limited. These techniques approach the issue as a query translation problem. That is, these techniques suggest queries that are translations of the original query. When used as a means for cross-lingual information retrieval (CLIR), for example, the system may perform a query translation followed by a monolingual information retrieval (IR) using the translation of the origin of query as the search query. Typically, queries are translated either using a bilingual dictionary, some machine translation software, or a parallel corpus. In other query translation methods, out-of-vocabulary (OOV) term translations are mined from the Web using a search engine to alleviate the problem of OOV, which is one of the major bottlenecks for CLIR. In others, bilingual knowledge is acquired based on anchor text analysis. In addition, word co-occurrence statistics in the target language has been leveraged for translation disambiguation.

Many of these translation techniques rely on static knowledge and data and therefore cannot effectively reflect the quickly shifting interests of Web users. For those translation approaches may help reduce the problem of static knowledge, they have other inherent problems existing with any cross-lingual query suggestion (CLQS) model that simply suggest straight translations of the queries. For instance, a translated term may be a reasonable translation, but it may not be popularly used in the target language. For example, the French query "aliment biologique" is translated into "biologic food" by Google translation tool, yet the correct formulation nowadays should be "organic food". Therefore, there exist many mismatches between the translated terms and the terms in the target language. These mismatches make the suggested terms in the target language ineffective.

Furthermore, it is arguable that accurate query translation may not be necessary for CLQS. Indeed, in many cases, it is helpful to introduce words even if they are not direct translations of any query word, but are closely related to the meaning of the query. This observation has led to the development of cross-lingual query expansion (CLQE) techniques, some of which reported the enhancement on CLIR by post-translation expansion, and others developed a cross-lingual relevancy model by leveraging the cross-lingual co-occurrence statistics in parallel texts. However, query expansion cannot be used as a substitute for query suggestion. Although query expansion is related to query suggestion, there is an essential difference between them. While expansion aims to extend the original query with new search terms to narrow the scope of the search, query suggestion aims to suggest full queries that have been formulated by users so that the query integrity and coherence and preserved the suggested queries.

Furthermore, there is a lack of a unified framework to combine the wide spectrum of resources and recent advances of mining techniques.

SUMMARY

The cross-lingual query suggestion (CLQS) aims to suggest relevant queries for a given query in a different language. The techniques disclosed herein improve CLQS by exploiting the query logs in the language of the suggested queries. The disclosed techniques include a method for learning and determining a cross-lingual similarity measure between two queries in different languages.

In one embodiment, the disclosed techniques use a discriminative model to learn and estimate the cross-lingual query similarity. The discriminative model starts with first identifying candidate queries in target language using a combination of multiple methods based on monolingual and cross-lingual information such as word translation relations and word co-occurrence statistics. The identified candidate queries in target language may be further expanded using monolingual query suggestion. The resultant candidate queries in target language may be checked against the query log of the target language to select a narrowed set of candidate queries in target language, which are then evaluated using a cross-lingual similarity score for cross-lingual suggestion. One embodiment uses both the query log itself and click-through information associated therewith to identify the most pertinent cross-lingual query to be suggested.

Disclosed are also techniques for integrating multiple lingual resources of different characteristics in a principled manner. The multiple lingual resources are represented by a feature vector in an input feature space which is mapped to a kernel space for estimating the cross-lingual similarity. A support vector machine algorithm may be used for learning the weight vector for such estimation.

The disclosed techniques provide an effective means to map the input query of one language to queries of the other language in the query log, and have significance in scenarios of cross-language information retrieval (CLIR) and cross-lingual keyword bidding for search engine advertisement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The cross-lingual query suggestion techniques are described below with an overview of the processes followed by a further detailed description of the exemplary embodiments. In this description, the order in which a process is described is not intended to be construed as a limitation, and any number of the described process blocks may be combined in any order to implement the method, or an alternate method.

Figure 1:
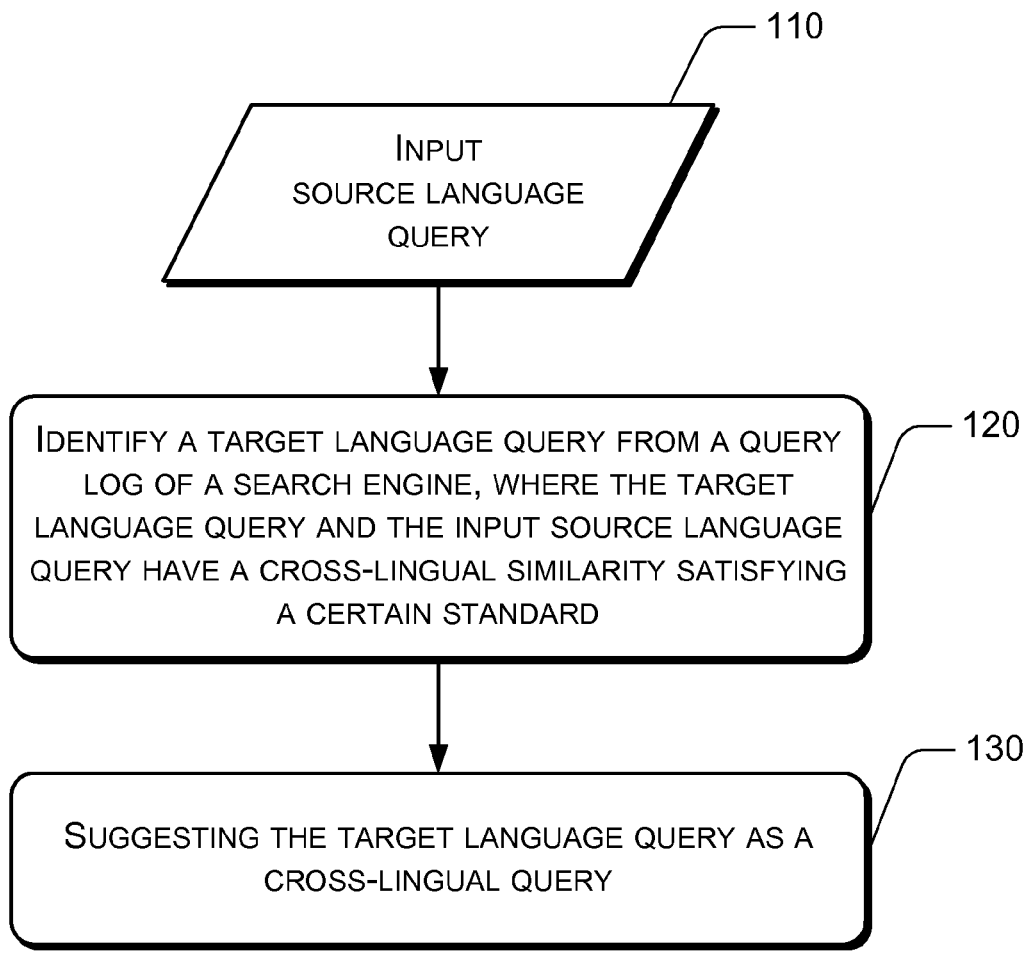
FIG. 1 is a flowchart illustrating aspects of a cross-lingual query suggestion process disclosed in the present description.

FIG. 1 is a flowchart illustrating aspects of a cross-lingual query suggestion process disclosed in the present description.

At block 110, an input query in source language is given. This is typically provided by a search engine user. The input query in source language may be provided in various application scenarios, including cross-lingual information retrieval and cross-lingual keyword bidding for search engine advertisement.

At block 120, for the input query in source language, the process identifies a query in target language from a query log of a search engine. The query in target language is a query written in the target language which is a different language from the source language. For example, the input source language may be French, and the target language may be English. A general condition for a query in target language to be selected in this identification process is that the query in target language and the input query in source language have a cross-lingual similarity satisfying a certain standard. One example of such a standard is a preset threshold value. Further detail of acquiring candidate queries in target language and computing cross-lingual similarity is given later in this description.

At block 130, the process suggests the query in target language as a cross-lingual query. For example, if the user has provided the original input query in source language for the purpose of cross-lingual information retrieval using a search engine, the suggested query in target language may be used as a search query to retrieve relevant documents from websites in the target language. Typically, the information retrieval using the query in target language is performed in addition to the information retrieval using the original input query in source language. That is, the query in target language is used to supplement the original input query in source language in order to broaden the scope of the search in a cross-lingual information retrieval. However, in some situations, the query in target language may be used alone to perform an information retrieval from websites in the target language. It is also appreciated that multiple queries in target language may be identified and suggested.

Figure 2:
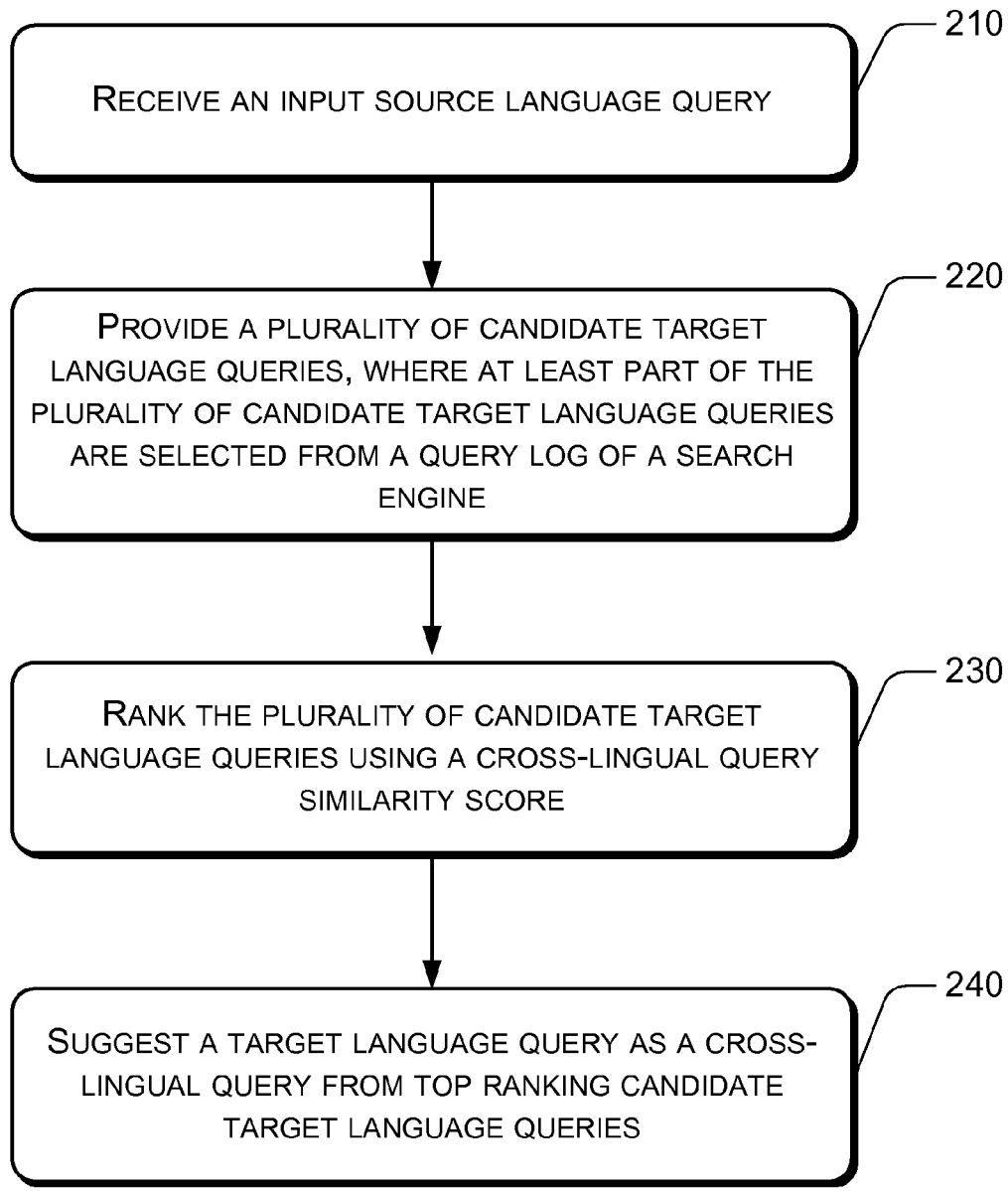
FIG. 2 is a flowchart illustrating aspects of another cross-lingual query suggestion process.

FIG. 2 is a flowchart illustrating aspects of another cross-lingual query suggestion process.

At block 210, the process receives an input query in source language. This is typically provided by a search engine user.

At block 220, the process provides a set of candidate queries in target language. At least some of the candidate queries in target language are selected from a query log of a search engine. As will be shown later in this description, candidate queries in target language may be provided by Web mining and/or a query expansion using monolingual query suggestion. In one embodiment, candidate queries are limited to those that are also found in a query log.

At block 230, the process ranks the set of candidate queries in target language using a cross-lingual query similarity score. Further detail of computing cross-lingual similarity is given later in this description.

At block 240, the process suggests a query in target language from top-ranking candidate queries in target language as a cross-lingual query.

The cross-lingual query suggestion (CLQS) disclosed herein aims to solve the mismatch problem encountered by traditional methods which approach CLQS as a query translation problem, i.e., by suggesting the queries that are translations of the original query. This disclosure proposes to solve the mismatch problem by mapping the input queries in the source language and the queries in the target language, using the query logs of a search engine. The disclosed techniques exploit the fact that the users of search engines in the same period of time have similar interests, and they submit queries on similar topics in different languages. As a result, a query written in a source language likely has an equivalent in a query log in the target language. In particular, if the user intends to perform cross-lingual information retrieval (CLIR), then the original query input by the user in the source language is even more likely to have its correspondent included in the query in target language log.

A query log of a search engine usually contains user queries in different languages within a certain period of time. In general, if a candidate query for CLQS appears often in the query log of the target language, the candidate query is more likely to be an appropriate cross-lingual query that can be suggested to the user. In addition to the query terms, the click-through information is also recorded. With this information, one knows which documents have been selected by users for each query.

Given a query in the source language, a CLQS task is to determine one or several similar queries in the target language from the query log. The first issue faced by a cross-lingual query suggestion method is to learn and estimate a similarity measure between two queries in different languages. Although various statistical similarity measures have been studied for monolingual terms, most of them are based on term co-occurrence statistics, and can hardly be applied directly in cross-lingual settings.

The cross-lingual similarity measure may be calculated based on both translation information and monolingual similarity information. Each type of the information is applied using one or more tools or resources. In order to provide up-to-date query similarity measure, it may not be sufficient to use only a static translation resource for translation. Therefore, one embodiment integrates a method to mine possible translations on the Web. This method is particularly useful for dealing with OOV terms.

Given a set of resources of different natures, another issue faced by a cross-lingual query suggested method is how to integrate the resources in a principled manner. This disclosure proposes a discriminative model to learn the appropriate similarity measure. The principle used in the discriminative model is as follows: assuming a reasonable monolingual query similarity measure, for any training query example for which a translation exists, its similarity measure (with any other query) is transposed to its translation. Using this principle, the desired cross-language similarity value for the training query samples may be computed. A discriminative model is then used to learn a cross-language similarity function which fits the best training examples.

Based on the above principle, method of calculating the similarity between query in source language and the query in target language is proposed. The method exploits, in addition to the translation information, a wide spectrum of bilingual and monolingual information, such as term co-occurrences, and query logs with click-through data. A discriminative model is used to learn the cross-lingual query similarity based on a set of manually translated queries. The model is trained by optimizing the cross-lingual similarity to best fit the monolingual similarity between one query and the other query's translation.

Figure 3:
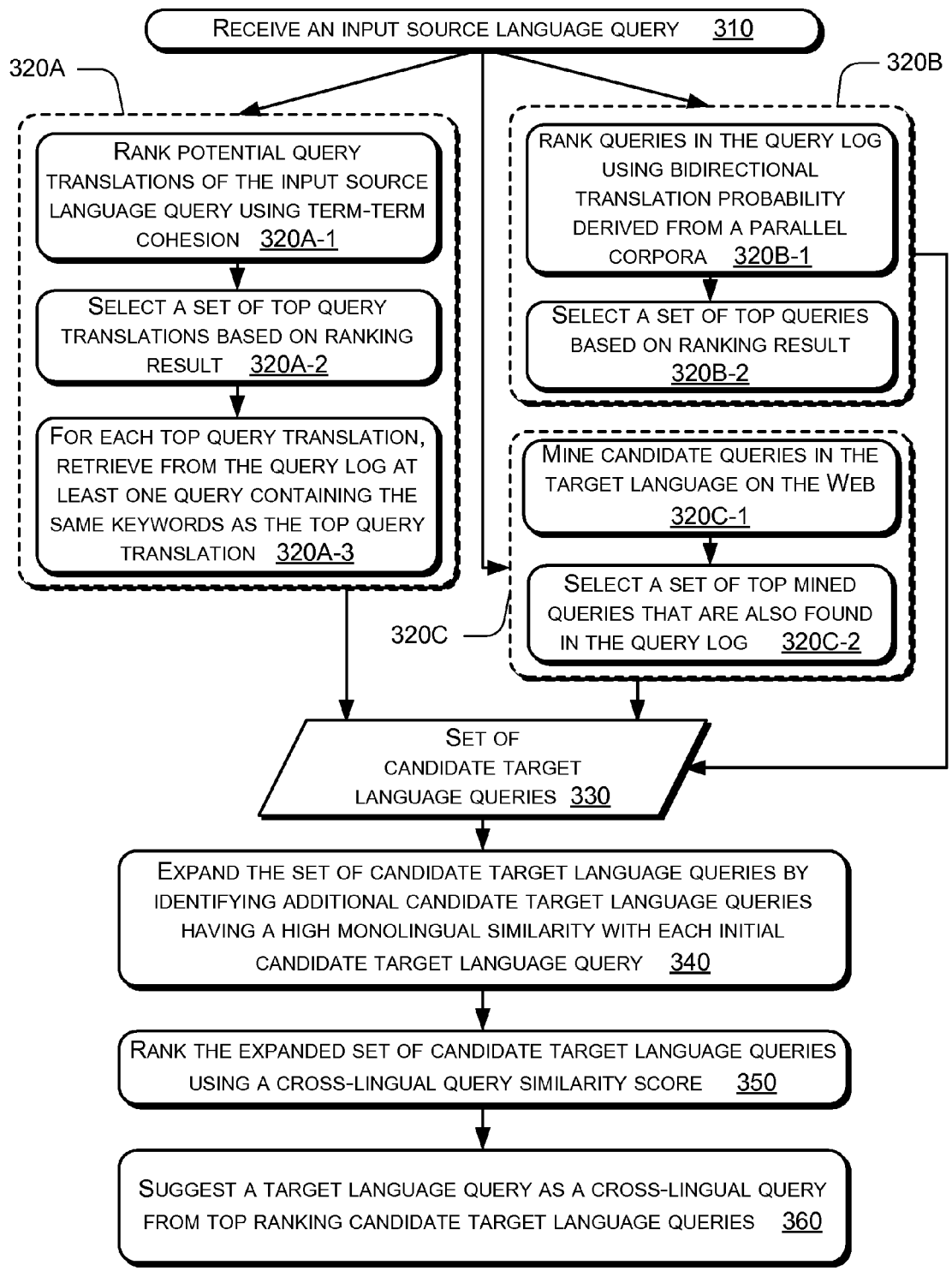
FIG. 3 is a flowchart illustrating an exemplary process of cross-lingual query suggestion integrating multiple resources of various types of information, including translation information, bilingual information and monolingual information.

FIG. 3 is a flowchart illustrating an exemplary process of cross-lingual query suggestion integrating multiple resources of various types of information, including translation information, bilingual information and monolingual information.

At block 310, the process receives an input query in source language.

Blocks 320A, 320B and 320C each represent an optional process for utilizing a certain type of information resource to identify and provide candidate queries in target language. Block 320A is a process for providing candidate queries in target language using a bilingual dictionary-based translation score for ranking. At sub-block 320A-1, the process ranks potential query translations of the input query in source language using term-term cohesion, which is further described later in this description. The potential query translations may be initially constructed from a bilingual dictionary. At sub-block 320A-2, the process selects a set of top query translations based on the ranking result. At sub-block 320A-3, for each top query translation, the process retrieves from the query log any query containing the same keywords as the top query translation.

Block 320B is an alternative process for providing candidate queries in target language using bidirectional translation score for ranking. At sub-block 320B-1, the process ranks queries in the query log using bidirectional translation probability derived from parallel corpora of the source language and the target language. The bidirectional translation probability is further described later in the present description. At sub-block 320B-2, the process selects a set of top queries based on ranking result.

Block 320C is another alternative process for providing candidate queries in target language using web mining. At sub-block 320C-1, the process mines candidate queries in target language co-occurring with the input query on the web. The mining method is further described later in the present description. At sub-block 320C-2, the process selects a set of top ranking mined queries in the target language. In one embodiment, only those queries that are also found in the query log are selected.

The results of processes 320A, 320B and 320C are pooled together to form a set of candidate queries in target language 330. It should be noted that any combination (including single) of the three processes 320A, 320B and 320C may be run for acquiring the set of candidate queries in target language 330. Further detail of the three processes 320A, 320B and 320C is described in later sections of the present disclosure.

At block 340, the process expands the set of candidate queries in target language 330 by identifying additional candidate queries in target language having a high monolingual similarity with each initial candidate query in target language. It is noted that the expansion described at block 340 is optional.

At block 350, the process ranks the set of candidate queries in target language 330, or the expanded set of candidate queries in target language if block 340 is performed, using a cross-lingual query similarity score. The computation of the cross-lingual query similarity score will be described in further detail later in the present description.

At block 360, the process suggests a query in target language as a cross-lingual query from the top ranking candidate queries in the target language.

Further details of processes of FIGS. 1-3 are described below from various aspects. The following sections first describe the detail of a discriminative model for cross-lingual query similarity estimation, and then introduce several exemplary features (monolingual and cross-lingual information) that are used in the discriminative model.

Discriminative Model for Estimating Cross-Lingual Query Similarity

One embodiment of the present CLQS process uses a discriminative model to learn cross-lingual query similarities in a principled manner. The principle is as follows. For a reasonable monolingual query similarity between two queries in the same language, a cross-lingual correspondent query similarity can be deduced between one query and the other query's translation. Specifically, for a pair of queries in different languages, their cross-lingual similarity should fit the monolingual similarity between one query and the other query's translation. For example, the similarity between French query "pages jaunes" (i.e., "yellow page" in English) and English query "telephone directory" should be equal to the monolingual similarity between the translation of the French query "yellow page" and "telephone directory".

There are many ways to obtain a monolingual similarity measure between query terms, e.g., term co-occurrence based mutual information and $\chi^2$. Any of these monolingual similarity measures can be used as the target for the cross-lingual similarity function to fit in a training and learning algorithm.

In one embodiment, cross-lingual query similarity estimation is formulated as a regression task as follows:

Given a query in source language $q_f$, a query in target language $q_e$, and a monolingual query similarity $sim_{ML}$, the corresponding cross-lingual query similarity $sim_{CL}$ is defined as follows:

$$sim_{CL}(q_f, q_e) = sim_{ML}(T_{q_f}, q_e) \qquad (1)$$

where $Tq_f$ is the translation of $q_f$ in the target language.

A training corpus may be created based on Equation (1). In order to do this, a list of sample query and their translations may be provided. Then an existing monolingual query suggestion system can be used to automatically produce similar queries for each translation. The sample queries and their translations, together with the translations' corresponding similar queries (which are in the same language and generated by the monolingual query suggestion system), constitute a training corpus for cross-lingual similarity estimation. One advantage of this embodiment is that it is fairly easy to make use of arbitrary information sources within a discriminative modeling framework to achieve optimal performance.

Support vector machine (SVM) regression algorithm may be used to learn the cross-lingual term similarity function. Given a vector of feature functions $f$ between $q_f$ and $q_e$, $sim_{CL}(q_f, q_e)$ is represented as an inner product between a weight vector and the feature vector in a kernel space as follows:

$$sim_{CL}(q_f, q_e) = w \cdot \phi(f(q_f, q_e)) \qquad (2)$$

where $\phi$ is the mapping from the input feature space onto the kernel space, and w is a weight vector in the kernel space.

The dimensionality of the feature vector $\phi(f(q_f,q_e))$ and the dimensionality of the weight factor w are both determined by the number of different features used in the algorithm. For example, the feature vector and the weight factor w both have four dimensions when four different features are used together in the algorithm. The weight factor w contains the information of weights distributed among the multiple features, and the value of the weight factor w is to be learned by the SVM regression training. Once the weight vector w is learned, the Equation (2) can be used to estimate the similarity between queries of different languages. As such, the Equations (1) and (2) construct a regression model for cross-lingual query similarity estimation.

Figure 4:
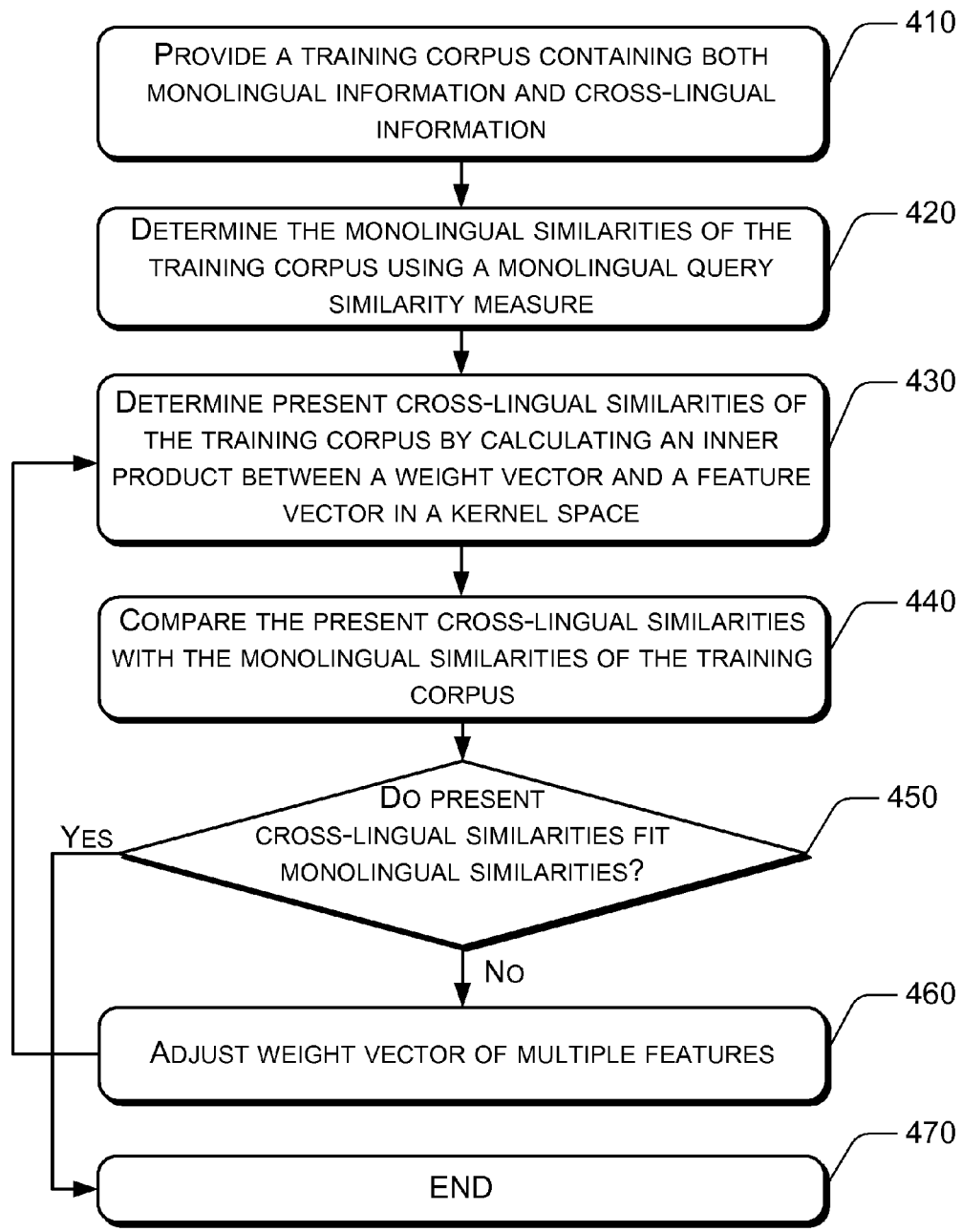
FIG. 4 is a flowchart illustrating an exemplary process to learn the feature vector w for computing cross-lingual similarities.

FIG. 4 is a flowchart illustrating an exemplary process to learn the feature vector w for computing cross-lingual similarities. At block 410, a process provides a training corpus containing both monolingual information and cross-lingual information. The exemplary training corpus as described above may be used. The exemplary training corpus may include a list of queries, corresponding translations and expanded translations.

At block 420, the process determines the monolingual similarities of the training corpus using a monolingual query similarity measure.

At block 430, the process determines the present cross-lingual similarities of the training corpus by calculating an inner product between a weight vector and a feature vector in a kernel space, as given by Equation (2).

At block 440, the process compares the present cross-lingual similarities with the monolingual similarities of the training corpus.

At block 450, the process determines whether the present cross-lingual similarities fit the monolingual similarities of the training corpus, as indicated in Equation (1). If not, the process goes to block 460. If yes, the process ends at block 470. The standard for fitting may be a preset threshold measuring how close the present cross-lingual similarities and the monolingual similarities are to each other.

At block 460, the process adjusts the weight vector, and returns to block 430 for the next round of fitting.

It is noted that instead of regression, one may simplify the task as a binary or ordinal classification, in which case CLQS can be categorized according to discontinuous class labels, e.g., relevant and irrelevant, or a series of levels of relevancies, e.g., strongly relevant, weakly relevant, and irrelevant. In either case, one can resort to discriminative classification approaches, such as an SVM or maximum entropy model, in a straightforward way. However, the regression formalism enables one to fully rank the suggested queries based on the similarity score given by Equation (1).

In the following sections, the monolingual query similarity measure and the feature functions used for SVM regression are further described.

Monolingual Query Similarity Measure Based on Click-Through Information:

Any monolingual term similarity measure can be used as the regression target. One embodiment selects the monolingual query similarity measure described in Wen, J. R., Nie, J.-Y., and Zhang, H. J., "Query Clustering Using User Logs", *ACM Trans. Information Systems*, 20(1):59-81, 2002, which reports good performance by using search users' click-through information in query logs. The benefit of using this monolingual similarity is that the similarity is defined in a context similar to the present context. That is, the monolingual similarity is defined according to a user log that reflects users' intention and behavior. Using a monolingual similarity measure such as this, one can expect that the cross-language term similarity learned therefrom also reflects users' intention and expectation.

In one embodiment, monolingual query similarity is defined by combining both query content-based similarity and click-through commonality in the query log.

The content similarity between two queries p and q is defined as follows:

$$similarity_{content}(p, q) = \frac{KN(p, q)}{Max(kn(p), kn(q))} \quad (3)$$

where kn(x) is the number of keywords in a query x (e.g., p or q), KN(p, q) is the number of common keywords in the two queries p and q.

The click-through based similarity is defined as follows, $$similarity_{click-through}(p, q) = \frac{RD(p, q)}{Max(rd(p), rd(q))} \quad (4)$$

where rd(x) is the number of clicked URLs for a query x (e.g., p or q), and RD(p, q) is the number of common URLs clicked for two queries p and q.

Accordingly, the similarity between two queries is a linear combination of the content-based and click-through-based similarities, and is presented as follows:

$$similarity(p,q) = \alpha * similarity_{content}(p,q) + \beta * similarity_{click-through}(p,q) \quad (5)$$

where $\alpha$ and $\beta$ are the relative importance of the two similarity measures. One embodiment sets $\alpha=0.4$ and $\beta=0.6$. Queries with similarity measure higher than a threshold with another query will be regarded as relevant monolingual query suggestions (MLQS) for the latter. The threshold is set as 0.9 empirically in one example.

Features Used for Learning Cross-Lingual Query Similarity Measure

This section describes the extraction of candidate relevant queries from the query log with the assistance of various monolingual and bilingual resources utilized as features. Feature functions over source query and the relevant cross-lingual candidates are defined. Some of the resources used here, such as bilingual lexicon and parallel corpora, have been traditionally used for query translation. It is noted that the present disclosure employs these resources as an assistant means for finding relevant candidates in the query log, rather than for acquiring accurate translations.

Feature 1: Bilingual Dictionary-Based Scoring Using Term-Term Cohesion

The first feature used is bilingual dictionary-based scoring, which is illustrated below with an example using a built-in-house bilingual dictionary containing 120,000 unique entries to retrieve candidate queries. Since multiple translations may be associated with each source word, co-occurrence based translation disambiguation is performed. The process is as follows.

Given an input query $q_f = \{w_{f1}, w_{f2}, \ldots w_{fn}\}$ in the source language, for each query term $w_{fi}$ a set of unique translations are provided by the bilingual dictionary D as: $D(w_{fi}) = \{t_{i1}, t_{i2}, \ldots, t_{im}\}$. Then the term-term cohesion between the translations of two query terms is measured using mutual information which is computed as:

$$MI(t_{ij}, t_{kl}) = P(t_{ij}, t_{kl}) \log \frac{P(t_{ij}, t_{kl})}{P(t_{ij})P(t_{kl})} \quad (6)$$

where $$P(t_{ij}, t_{kl}) = \frac{C(t_{ij}, t_{kl})}{N}, P(t) = \frac{C(t)}{N}.$$

Here C(x, y) is the number of queries in the query log containing both terms x and y, C(x) is the number of queries containing term x, and N is the total number of queries in the query log.

Based on the term-term cohesion defined in Equation (6), all possible query translations are ranked using the summation of the term-term cohesion $$S_{dict}(T_{q_f}) = \sum_{i,k,i \neq k} MI(t_{ij}, t_{kl}).$$

Top ranking query translations are then selected. For example, a set of top-4 query translations is selected and denoted as $S(T_{q_f})$. For each possible query translation $T \in S$ $(T_{q_f})$, the system retrieves from the target language query log available queries containing the same keywords as T does. Preferably, all such available queries are retrieved. The retrieved queries are collected as candidate target queries, and are assigned $S_{dict}(T)$ as the value of the feature Dictionary-based Translation Score.

Feature 2: Bidirectional Translation Score Based on Parallel Corpora

The second feature that may be used is bidirectional translation score based on parallel corpora. Parallel corpora are valuable resources for bilingual knowledge acquisition. Different from the bilingual dictionary, the bilingual knowledge learned from parallel corpora assigns a probability for each translation candidate, which is useful information in acquiring dominant query translations.

In one embodiment, the Europarl corpus (a set of parallel French and English texts from the proceedings of the European Parliament) is used. The corpus is sentence aligned first. The word alignments are then derived by training an IBM translation model 1 using GIZA++. The learned bilingual knowledge is used to extract candidate queries from the query log. The process is as follows.

Given a pair of queries $q_f$ in the source language and $q_e$ in the target language, the Bi-Directional Translation Score is defined as follows:

$$S_{IBM1}(q_f, q_e) = \sqrt{p_{IBM1}(q_f|q_e)p_{IBM1}(q_e|q_f)} \quad (7)$$

where $p_{IBM1}(y|x)$ is the word sequence translation probability given by IBM model 1 which has the following form:

$$p_{IBM1}(y|x) = \frac{1}{(|x|+1)^{|y|}} \prod_{j=1}^{|y|} \sum_{i=0}^{|x|} p(y_j|x_i) \quad (8)$$

where $p(y_j|x_i)$ is the word to word translation probability derived from the word-aligned corpora.

One purpose to use the bidirectional translation probability is to deal with the fact that common words can be considered as possible translations of many words. By using bidirectional translation, one may test whether the translation words can be translated back to the source words. This is helpful to focus on the translation probability onto the most specific translation candidates.

Based on the above bidirectional translation scoring, top queries are selected. For example, given an input query $q_f$, the top ten queries $\{q_e\}$ having the highest bidirectional translation scores with $q_f$ are retrieved from the query log, and $S_{IBM1}(q_f, q_e)$ calculated in Equation (7) is assigned as the value for the feature Bi-Directional Translation Score.

Feature 3: Frequency in Web Mining Snippets and CODC Measure

The third feature that may be used is frequency in Web mining snippets and co-occurrence frequency. Web mining has been used to acquire out-of-vocabulary words (OOV), which account for a major knowledge bottleneck for query translation and CLIR. For example, web mining has been exploited to acquire English-Chinese term translations based on the observation that Chinese terms may co-occur with their English translations in the same web page. In this disclosure, a similar web mining approach is adapted to acquire not only translations but semantically related queries in the target language.

It is assumed that if a query in the target language co-occurs with the source query in many web pages, the two queries are probably semantically related. Therefore, a simple method is to send the source query to a search engine (e.g., Google search engine) to search for Web pages in the target language in order to find related queries in the target language. For instance, by sending a French query "pages jaunes" to search for English pages, the English snippets containing the key words "yellow pages" or "telephone directory" will be returned. However, this simple approach may induce significant amount of noise due to the non-relevant returns from the search engine. In order to improve the relevancy of the bilingual snippets, the simple approach is modified by using a more structured query.

An exemplary query modification is as follows. The original query is used with dictionary-based query keyword translations to perform a search. Both the original query and the dictionary-based query keywords translations are unified by the ∧(and) ∨(OR) operators into a single Boolean query. For example, for a given query q=abc where the set of translation entries in the dictionary of for a is $\{a_1, a_2, a_3\}$, b is $\{b_1, b_2\}$ and c is $\{c_1\}$, one may issue $q \land (a_1 \lor a_2 \lor a_3) \land (b_1 \lor b_2) \land c_1$ as one web query.

Top snippets returned by the modified and unified web query are retrieved to select candidate queries in target language. In one embodiment, the selection makes use of the query log to select only those Web mined queries that are also found in the query log. For example, from the returned top 700 snippets, the most frequent 10 target queries that are also in the query log are identified, and are associated with the feature Frequency in the Snippets.

Furthermore, Co-Occurrence Double-Check (CODC) Measure may be used to weight the association between the source and target queries. CODC Measure has been proposed as an association measure based on snippet analysis, named Web Search with Double Checking (WSDC) model. In WSDC model, two objects a and b are considered to have an association if b can be found by using a as query (forward process), and a can be found by using b as query (backward process) by web search. The forward process counts the frequency of b in the top N snippets of query a, denoted as freq(b @ a). Similarly, the backward process count the frequency of a in the top N snippets of query b, denoted as freq(a@b). Then the CODC association score is defined as follows:

$$S_{CODC}(q_f, q_e) = \begin{cases} 0, & \text{if } freq(q_e @ q_f) \times freq(q_f @ q_e) = 0 \\ e^{\left[\log \frac{freq(q_e @ q_f)}{freq(q_f)} \times \frac{freq(q_f @ q_e)}{freq(q_e)}\right]^\alpha}, & \text{otherwise} \end{cases} \quad (9)$$

CODC measures the association of two terms in the range between 0 and 1, where under the two extreme cases, $q_e$ and $q_f$ are of no association when $freq(q_e@q_f)$=0 or $freq(q_f@q_e)$= 0, and are of the strongest association when $freq(q_e@q_f)$= $freq(q_f)$ and $freq(q_f@q_e)$=$freq(q_e)$. In one experiment, $\alpha$ is set at 0.15 following an exemplary practice.

A query $q_e$ mined from the Web may be associated with a feature CODC Measure with $S_{CODC}(q_f, q_e)$ as the feature value.

Feature 4: Monolingual Query Suggestion-Based Feature

The candidate queries in target language retrieved using the above-described bilingual dictionary, parallel corpora and web mining are pulled together as a set of candidate queries $Q_0$. A monolingual query suggestion system is called to produce more related queries in the target language using the set of candidate queries $Q_0$.

For a query $q_e$, its monolingual source query $SQ_{ML}(q_e)$ is defined as the query in $Q_0$ having the highest monolingual similarity with $q_e$, i.e., $$SQ_{ML}(q_e) = \arg \max_{q'_e \in Q_0} sim_{ML}(q_e, q'_e) \quad (10)$$

The monolingual similarity between the query $q_e$ and $SQ_{ML}(q_e)$ is used as the value of the $q_e$'s Monolingual Query Suggestion-based Feature. A threshold may be set for selecting additional candidate target queries using Equation (10). For example, if the monolingual similarity between a query $q_e$ and its source query $SQ_{ML}(q_e)$ meets or is above the threshold, the query $q_e$ is chosen to be a candidate query in target language, in addition to the set of candidate queries $Q_0$, to be ranked using the cross-lingual query similarity score and suggested as a cross-lingual query (e.g., blocks 230 and 240 in FIG. 2, or blocks 350 and 260 in FIG. 3) in the next steps. For any query that is already in $Q_0$ (i.e., $q \in Q_0$), its Monolingual Query Suggestion-Based Feature is set as 1, the maximum monolingual similarity value.

For any query $q_e \notin Q_0$, its values of Dictionary-based Translation Score, Bi-Directional Translation Score, Frequency in the Snippet, and CODC Measure are set to be equal to the feature values of $SQ_{ML}(q_e)$.

The target language queries $q_e$ used in this part may be from any suitable source. In one embodiment, however, the target language queries $q_e$ used in this part are selected from the query log of the search engine.

Estimating Cross-Lingual Query Similarity

In the above, four categories of features are used to acquire a set of candidate queries in target language, which include $Q_0$ and its monolingual expansion if Feature 4 (monolingual query suggestion) is used. The four features are also used to learn the cross-lingual query similarity. For example, SVM regression algorithm is used to learn the weights in Equation (2). In one embodiment, LibSVM toolkit is used for the regression training.

In the prediction stage, the set of candidate queries in target language are ranked using the cross-lingual query similarity score computed using Equation (2), and the queries with similarity score lower than a threshold will be regarded as non-relevant. The threshold is learned using a development data set by fitting MLQS's output.

Exploitation of the above described resources and features may be conducted at various levels. For example, the simplest CLQS system may use a dictionary only. The next level my use a dictionary and parallel corpora, a higher level may use dictionary, parallel corpora and web mining, while a comprehensive CLQS system may combine dictionary, parallel corpora, web mining and monolingual query suggestion together. It is expected that the comprehensive CLQS system may tend to have better performance.

CLIR Based on Cross-Lingual Query Suggestion

The presently disclosed CLQS is primarily used as cross-lingual query suggestion, but may also be used as an alternative tool for query translation. Using the CLQS for query translation may also be useful for testing the effectiveness of the CLQS in CLIR tasks.

Given a source query $q_f$, a set of relevant queries $\{q_e\}$ in the target language are recommended using the cross-lingual query suggestion system. In an exemplary CLIR test, a monolingual IR system based on the BM25 model is called using each $q \in \{q_e\}$ as queries to retrieve documents. The retrieved documents are re-ranked based on the sum of the BM25 scores associated with each monolingual retrieval. The results show that the presently described CLQS as a translation method is more effective than the traditional query translation method. Based on the observation that the CLIR performance heavily relies on the quality of the suggested queries, the resulting good performance of CLIR is believed to indicate high quality of the suggested queries.

Implementation Environment

The above-described techniques may be implemented with the help of a computing device, such as a server, a personal computer (PC) or a portable device having a computing unit.

Figure 5:
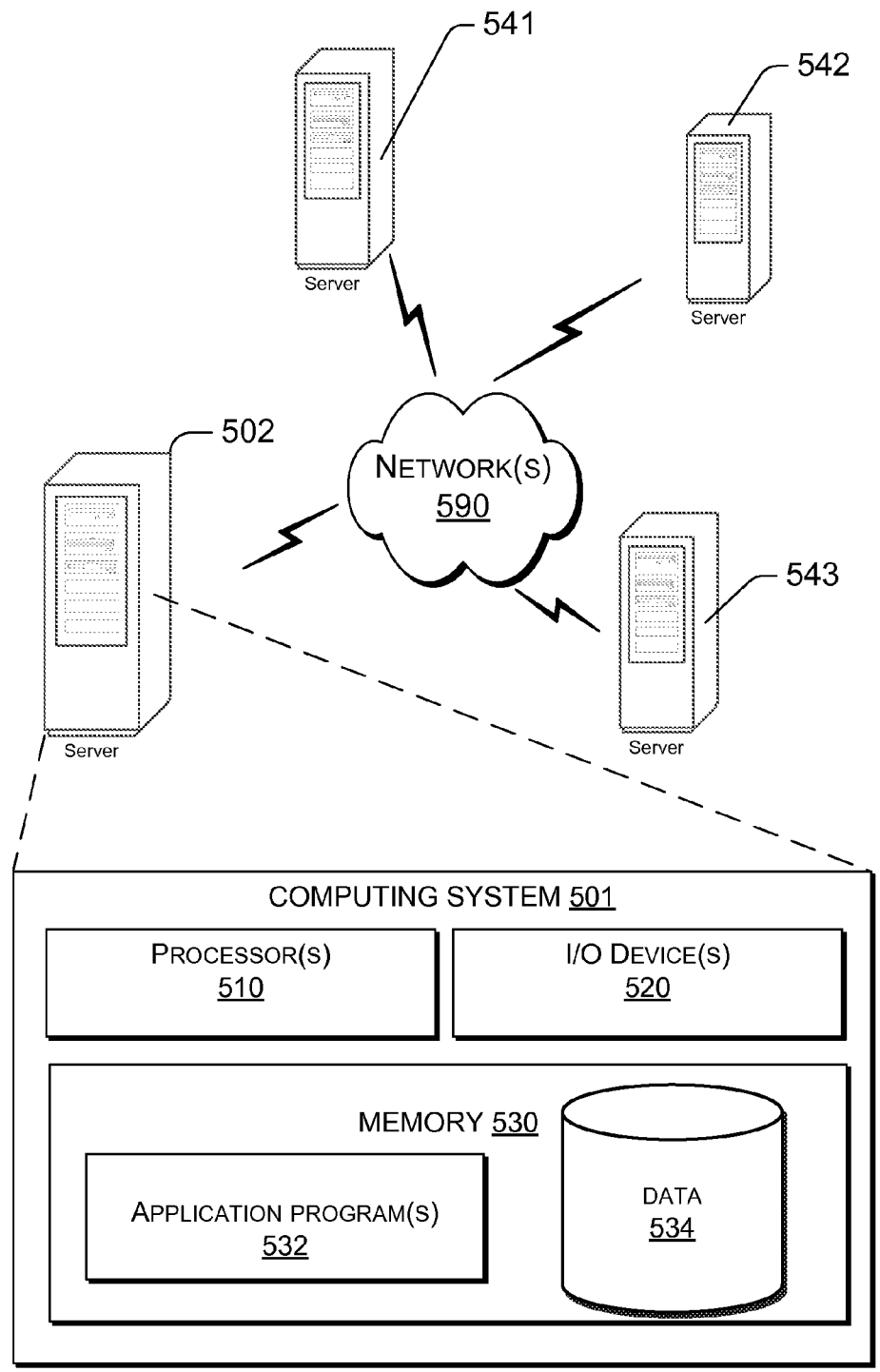
FIG. 5 shows an exemplary environment for implementing the method of the present disclosure.

FIG. 5 shows an exemplary environment for implementing the method of the present disclosure. Computing system 501 is implemented with computing device 502 which includes processor(s) 510, I/O devices 520, computer readable media (e.g., memory) 530, and network interface (not shown). The computer device 502 is connected to servers 541, 542 and 543 through networks 590.

The computer readable media 530 stores application program modules 532 and data 534 (such as monolingual and cross-lingual data). Application program modules 532 contain instructions which, when executed by processor(s) 510, cause the processor(s) 510 to perform actions of a process described herein (e.g., the processes of FIGS. 1-4).

For example, in one embodiment, computer readable medium 530 has stored thereupon a plurality of instructions that, when executed by one or more processors 510, causes the processor(s) 510 to:

(i) identify a query in target language from a query log based on a cross-lingual similarity with an input query in source language; and (ii) suggest the query in target language as a cross-lingual query.

To perform the above actions, the processor(s) 510 may also perform other actions as described herein, such as computing the cross-lingual similarity using Equation (2).

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Especially, the computer device 502 may be a search engine server, or a cluster of such search engine servers.

CONCLUSIONS

This disclosure describes a new approach to cross-lingual query suggestion (CLQS) by mining relevant queries in different languages from query logs. The system learns a cross-lingual query similarity measure by using a discriminative model exploiting multiple monolingual and bilingual resources. The model is trained based on the principle that cross-lingual similarity should best fit the monolingual similarity between one query and the other query's translation.

The CLQS has wide applications on World Wide Web, such as cross-language search or for suggesting relevant bidding terms in a different language. As the present CLQS exploits up-to-date query logs, it is expected that for most user queries, one can find common formulations on these topics in the query log in the target language. In this sense, the present CLQS also plays a role of adapting the original query formulation to the common formulations of similar topics in the target language.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for query suggestion performed by a processor executing computer-executable instructions stored on a memory device, the method comprising:
   for an input query in source language, identifying a query in target language from a query log of a search engine, the query in target language and the input query in source language having a cross-lingual similarity, the identifying the query in target language from the query log comprising:
      providing a plurality of candidate queries in target language;
      evaluating the plurality of candidate queries in target language at least partly by deducing a monolingual similarity between the input query in source language and a translation of a respective candidate query from target language to source language; and
      ranking the plurality of candidate queries in target language using a cross-lingual query similarity score, the cross-lingual query similarity score being based on a plurality of features and a weight of each feature in calculating the cross-lingual query similarity score; and
   suggesting the query in target language as a cross-lingual query at least partly based on click-through information of documents selected by users for the query in target language.

2. The method as recited in claim 1, wherein the cross-lingual query similarity score of the input query in source language $q_e$ and the candidate query in target language $q_f$ is computed using an equation $sim_{CL}(q_f, q_e) = w \cdot \phi(f(q_f, q_e))$, where $sim_{CL}(q_f, q_e)$ is the cross-lingual query similarity score, $f(q_f, q_e)$ is a feature vector, $\phi$ is a mapping from an input feature space onto a kernel space, and w is a weight vector in the kernel space.

3. The method as recited in claim 2, wherein the weight vector w is learned by a regression algorithm using a training set of input queries in source language and corresponding queries in target language.

4. The method as recited in claim 2, wherein the weight vector w is learned by a binary or ordinal classification algorithm in which cross-lingual query suggestions are categorized according to discontinuous class labels.

5. The method as recited in claim 2, wherein the weight vector w is learned by fitting a training set based on a principle that cross-lingual similarity of a pair of queries in two different languages fits the monolingual similarity between one query and a translation of the other query of the pair.

6. The method as recited in claim 2, wherein the feature vector $f(q_f, q_e)$ includes at least two of the feature functions selected from bilingual dictionary-based translation score, bidirectional translation score, frequency in Web mining snippets, and monolingual query suggestion-based feature.

7. The method as recited in claim 1, wherein the identifying the query in target language from the query log further comprises:
   identifying one or more queries in target language whose cross-lingual query similarity score with the input query meets or exceeds a threshold.

8. The method as recited in claim 7, wherein the threshold is learned using a development data set by fitting a monolingual query suggestion output.

9. The method as recited in claim 1, wherein the providing the plurality of candidate queries in target language comprises:
   ranking potential query translations of the input query in source language using term-term cohesion, the potential query translations being constructed from a bilingual dictionary;
   selecting a set of top query translations based on ranking result; and
   for each top query translation, retrieving from the query log at least one query containing the same keywords as the top query translation.

10. The method as recited in claim 1, wherein the providing the plurality of candidate queries in target language comprises:
    ranking queries in the query log using bidirectional translation probability derived from a parallel corpora of the source language and the target language; and
    selecting a set of top queries based on ranking result.

11. The method as recited in claim 1, wherein the providing the plurality of candidate queries in target language comprises:
    mining candidate queries in the target language on the Web, the each candidate query being a translation of the input query in source language or semantically related to the input query in source language.

12. The method as recited in claim 11, further comprising:
    ranking the candidate queries using a co-occurrence double-check measure;
    selecting a set of top candidate queries based on ranking result.

13. The method as recited in claim 1, wherein providing the plurality of candidate queries in target language comprises:

providing a set of initial candidate queries in target language; and expanding the set of initial candidate queries in target language by identifying additional candidate queries having a high monolingual similarity with each initial candidate query in target language.

14. A method for query suggestion performed by a processor executing computer-executable instructions stored on a memory device, the method comprising:

receiving an input query in source language;

providing a plurality of candidate queries in target language, at least part of the plurality of candidate queries in target language being selected from a query log of a search engine;

evaluating the plurality of candidate queries in target language at least partly by deducing a monolingual similarity between the input query in source language and a translation of a respective candidate query from target language to source language;

ranking the plurality of candidate queries in target language using a cross-lingual query similarity score, the cross-lingual query similarity score being based on a plurality of features and a weight of each feature in calculating the cross-lingual query similarity score; and from top ranking candidate queries in target language, suggesting a query in target language as a cross-lingual query at least partly based on click-through information of documents selected by users for the plurality of candidate queries in target language.

15. The method as recited in claim 14, wherein the providing the plurality of candidate queries in target language comprises:

ranking potential query translations of the input query in source language using term-term cohesion, the potential query translations being constructed from a bilingual dictionary;

selecting a set of top query translations based on ranking result; and for each top query translation, retrieving from the query log at least one query containing the same keywords as the top query translation.

16. The method as recited in claim 14, wherein the providing the plurality of candidate queries in target language comprises:

ranking queries in the query log using a bidirectional translation probability derived from a parallel corpora of the source language and the target language; and selecting a set of top queries based on ranking result.

17. The method as recited in claim 14, further comprising:

mining additional candidate queries in the target language on the Web, each additional candidate query being a translation of the input query in source language or semantically related to the input query in source language.

18. The method as recited in claim 14, further comprising:

expanding the plurality of candidate queries in target language by identifying additional candidate queries having a high monolingual similarity with each initial candidate query in target language.

19. A method for query suggestion performed by a processor executing computer-executable instructions stored on a memory device, the method comprising:

for an input query in source language, identifying a query in target language from a query log of a search engine, the query in target language and the input query in source language having a cross-lingual similarity, the identifying the query in target language from the query log comprising:

providing a plurality of candidate queries in target language; and ranking the plurality of candidate queries in target language using a cross-lingual query similarity score, the cross-lingual query similarity score of the input query in source language $q_e$ and the candidate query in target language $q_f$ being computed using an equation $sim_{CL}(q_f, q_e) = w \cdot \phi(f(q_f, q_e))$, $sim_{CL}(q_f, q_e)$ being the cross-lingual query similarity score, $f(q_f, q_e)$ being a feature vector, the feature vector $f(q_f, q_e)$ including at least two of the feature functions selected from bilingual dictionary-based translation score, bidirectional translation score, frequency in Web mining snippets, and monolingual query suggestion-based feature, $\phi$ being a mapping from an input feature space onto a kernel space, and w being a weight vector in the kernel space; and suggesting the query in target language as a cross-lingual query.

20. A method for query suggestion performed by a processor executing computer-executable instructions stored on a memory device, the method comprising:

for an input query in source language, identifying a query in target language from a query log of a search engine, the query in target language and the input query in source language having a cross-lingual similarity, the identifying the query in target language from the query log comprising:

providing a plurality of candidate queries in target language;

evaluating the plurality of candidate queries in target language at least partly by deducing a monolingual similarity between the input query in source language and a translation of a respective candidate query from target language to source language; and ranking the plurality of candidate queries in target language using a cross-lingual query similarity score, the cross-lingual query similarity score of the input query in source language $q_e$ and the candidate query in target language $q_f$ being computed using an equation $sim_{CL}(q_f, q_e) = w \cdot \phi(f(q_f, q_e))$, $sim_{CL}(q_f, q_e)$ being the cross-lingual query similarity score, $f(q_f, q_e)$ being a feature vector, $\phi$ being a mapping from an input feature space onto a kernel space, and w being a weight vector in the kernel space; and suggesting the query in target language as a cross-lingual query at least partly based on click-through information of documents selected by users for the query in target language.

* * * * *